United States Patent
Kimoto et al.

(10) Patent No.: US 8,276,946 B2
(45) Date of Patent: Oct. 2, 2012

(54) THREADED JOINT FOR STEEL TUBES

(75) Inventors: Masanari Kimoto, Kobe (JP); Kunio Goto, Kobe (JP); Masaru Takahashi, Narashino (JP); Kunihiro Fukui, Kawanishi (JP); Shigeo Nagasaku, Nishinomiya (JP); Ryuichi Imai, Kainan (JP); Shigeo Onishi, Osaka (JP); Hiroaki Ikegami, Nishinomiya (JP)

(73) Assignees: Sumitomo Metal Industries, Ltd., Osaka (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 12/551,651

(22) Filed: Sep. 1, 2009

(65) Prior Publication Data

US 2010/0059986 A1    Mar. 11, 2010

Related U.S. Application Data (63) Continuation of application No. PCT/JP2008/053492, filed on Feb. 28, 2008.

(30) Foreign Application Priority Data

Mar. 2, 2007   (JP) ................................ 2007-052905

(51) Int. Cl.
*F16L 11/00*    (2006.01)
(52) U.S. Cl. ............................ 285/94; 285/333; 285/334
(58) Field of Classification Search .................... 285/94, 285/333–334
See application file for complete search history.

(56) References Cited

U.S. PATENT DOCUMENTS

| | | |
|---|---|---|
| 2003/0094810 A1 | 5/2003 | Goto et al. |
| 2004/0239105 A1* | 12/2004 | Matsumoto et al. ............ 285/94 |

FOREIGN PATENT DOCUMENTS

| | | |
|---|---|---|
| EP | 1 411 288 | 4/2004 |
| EP | 1 548 346 | 6/2005 |
| GB | 2 321 468 | 7/1998 |
| GB | 2 403 732 | 1/2005 |
| JP | 1-12995 | 3/1989 |
| JP | 8-303655 | 11/1996 |
| JP | 10-205539 | 8/1998 |
| JP | 2001-65751 | 3/2001 |
| JP | 2002-173692 | 6/2002 |
| JP | 2002-221288 | 8/2002 |
| JP | 2002-327875 | 11/2002 |
| JP | 2002-348587 | 12/2002 |
| JP | 2003-74763 | 3/2003 |
| JP | 2004-53013 | 2/2004 |
| WO | 2007/026970 | 3/2007 |

* cited by examiner

*Primary Examiner* — Aaron Dunwoody
*Assistant Examiner* — Fannie Kee
(74) *Attorney, Agent, or Firm* — Clark & Brody

(57) ABSTRACT

A threaded joint for steel tubes has a contact surface (30) including a threaded portion and a non-threaded metal-to-metal contact portion. The contact surface of at least one of a pin and a box of the joint is coated with a first plating layer (34) made of a Cu—Zn alloy or a Cu—Zn-M1 alloy (wherein M1 is at least one element selected from Sn, Bi, and In). An undercoat (32) of one or both of a Ni plating layer (32a) and a Cu plating layer (32b) and an overcoat of a Sn-M2 alloy plating layer (36) (wherein M2 is one or more elements selected from Bi, In, Ni, Zn, and Cu) may be formed below and above the first layer, respectively. A solid lubricating coating (38a) and a viscous liquid or semisolid lubricating coating (38b) may also be formed atop the plating layer as a lubricating coating (38).

12 Claims, 2 Drawing Sheets

THREADED JOINT FOR STEEL TUBES

This application is a continuation of International Patent Application No. PCT/JP2008/053492 filed Feb. 28, 2008. This PCT application was not in English as published under PCT Article 21(2).

TECHNICAL FIELD

This invention relates to a threaded joint for steel tubes having improved galling resistance and corrosion resistance. A threaded joint for steel tubes according to the present invention is particularly suitable for use in connecting oil country tubular goods.

BACKGROUND ART

Oil country tubular goods (OCTG) which are driven into the ground for excavation of oil wells and natural gas wells can reach an overall length of several thousand meters in some cases. These long oil country tubular goods are constituted by steel tubes having a unit length of ten-some meters which are connected in series by short tubular couplings. The material of steel tubes and couplings is carbon steel, stainless steel, or high alloy steel, depending on the environment of use.

These steel tubes are connected by threaded engagement of a pin having a male (external) threaded portion on its outer peripheral surface and a box having a female (internal) thread on its inner peripheral surface. Typically, a pin is formed on both ends of a steel tube and a box is formed on the interior of a short coupling. A connecting portion constituted by this pin and box is a threaded joint for a steel tube.

A threaded joint for steel tubes requiring a high degree of gas tightness has unthreaded metal-to-metal contact portions which are formed on the end of the male thread of the pin and the base of the female thread of the box. When one end of the steel tube is inserted into the coupling and the male thread of the pin and the female thread of the box are tightened until the unthreaded metal-to-metal contact portions of the pin and the box are made to contact each other with a given amount of interference, a metal-to-metal seal is formed in those portions to provide the joint with an increased gas tightness.

In order to perform periodic inspection and the like, an oil country tubular good is sometimes lifted up and subjected to breakout operation in which the threads of the threaded joint are loosened and each of the steel tubes is disconnected from the coupling. After the completion of inspection or the like of each steel tube, makeup of the oil country tubular good is carried out by again tightening the threaded portions of the tubes and couplings, and the oil country tubular good is reused. The sliding contact surfaces of the threaded portions and the unthreaded metal-to-metal contact portions of the pin and the box are repeatedly subjected to strong friction at the time of makeup and breakout of an oil country tubular good. Accordingly, if a threaded joint does not have sufficient durability with respect to friction, seal defects (poor resistance to leaks) and galling (nonrepairable severe seizing) occur in the threaded portions and particularly in the unthreaded metal-to-metal contact portions of the joint when makeup and breakout are repeatedly carried out using the joint.

Therefore, a threaded joint for oil country tubular goods is (a) of course required to be able to resist tensile forces in the axial direction due to the weight of connected steel tubes, (b) it is required to be able to withstand the pressure of internal and external fluids, and (c) it is required to maintain good leak resistance and galling resistance without the occurrence of seal defects or galling when it is repeatedly used at least four times in the case of casing (large diameter tubes) and at least 10 times in the case of tubing (small diameter tubes). In recent years, there is a trend for oil wells to become deeper and deeper, and the frequency of use in severe environments such as in polar regions is increasing, so the quality required of threaded joints for steel tubes is becoming increasingly strict.

In the past, as proposed in below-described Patent Document 1 and the like, the contact surfaces of the pin and the box of a threaded joint such as the threaded portions of the joint have been treated by surface treatment such as copper plating or phosphate treatment, and for further improvement in galling resistance, the joint interface between the pin and the box is filled with a compound grease called dope which contains heavy metals such as Pb and which is applied each time makeup is performed.

However, under present circumstances in which preventing environmental pollution on a global scale is becoming an urgent problem, the use of dope containing Pb is being regulated. Dope which does not contain heavy metals such as Pb, Zn, and Cu (such dope being called green dope) has been developed and is being used. However, the performance of green dope is not so high, and depending on the material of the threaded joint, it cannot prevent the occurrence of galling.

Other methods of improving the leak resistance and galling resistance of threaded joints for steel tubes which have been proposed in the prior art include (1) a method in which a plating layer containing a powder of a fluororesin dispersed therein is formed, (2) a method in which a lubricating protective film is formed by sputtering, and (3) a method in which a solid lubricating coating is used in place of compound grease, but none of these has achieved sufficient leak resistance and galling resistance.

Below-described Patent Document 2 proposes a threaded joint for oil country tubular goods made of a high Cr steel having an Cr content of at least 9 mass % in which a Cu—Sn alloy plating layer is formed on the female threaded portion and the unthreaded metal-to-metal contact portion (metal-to-metal seal portion) of a coupling is constituting the joint. However, as a result of investigations of this threaded joint by the present inventors, it was found that it had the problem that corrosion easily occurs in the interface between the pin and the box. This corrosion is so-called crevice corrosion, and it becomes marked when green dope is applied as a lubricant at the time of makeup or when a solid lubricating coating or other lubricating coating is formed atop the plating layer. If this corrosion takes place in a threaded joint, leak resistance and galling resistance of the joint decrease due to the rust which develops.

Patent Document 1: JP 01-12995 B1
Patent Document 2: JP 2003-74763 A1

DISCLOSURE OF INVENTION

The object of the present invention is to provide a threaded joint for steel tubes which exhibits adequate leak resistance and galling resistance in a state in which green dope is applied or in an undoped state, and which has excellent corrosion resistance and prevents the occurrence of crevice corrosion even when green dope or a lubricating coating is present atop a plating layer.

The present inventors studied the mechanism of the phenomenon of galling at the time of makeup and breakout of a threaded joint for steel tubes. The phenomenon of galling is thought to occur by the heat generated due to resistance to deformation of metals which are in sliding movement to each other while they are in contact with each other, resulting in a local temperature increase to such a degree that the temperature exceeds the melting temperature of the metals, thereby causing fusion of the metals to each other. Accordingly, they reached the conclusion that good galling resistance can be obtained with a material having low resistance to deformation, i.e., a material having a high hardness and a high melting point.

It is indicated in above-mentioned Patent Document 2 that the Cu—Sn alloy plating layer proposed therein has the effect of improving galling resistance by the interaction of the lubricating properties of Sn which has a low strength (a low stress in shear fracture) and the high strength of Cu. In contrast, the present inventors found that by selecting a suitable alloy composition for the material of a plating layer so as to produce an intermetallic compound having a high hardness and include an is element having a high melting point as a major constituent, it is made difficult for the above-described fusion to occur and good galling resistance is obtained. From this standpoint, a Cu-based alloy plating layer is suitable.

As stated above, the Cu—Sn alloy plating layer proposed in Patent Document 2 has the problem that crevice corrosion tends to occur easily. The cause of this crevice corrosion is basically thought to be the formation of a microgalvanic cell between Cu, which is more noble, and the steel which contacts it, which is less noble. In order to solve this problem, it was found that a plating layer of a Cu alloy with a metal which is less noble than Cu, particularly a plating layer of a Cu—Zn based alloy which is either a Cu alloy with Zn, which is a metal far less noble (or has a much larger ionization tendency) than Cu, or a Cu alloy with Zn and at least one element selected from Sn, Bi, and In as additional less noble elements is optimal.

Also in the case of a Cu—Sn alloy, Sn is a less noble metal than Cu. However, when only Sn is alloyed with Cu, although the cause is not known, it is thought that Sn is passivated in such a manner that it can no longer inhibit the formation of a microgalvanic cell. Therefore, crevice corrosion occurs, and corrosion resistance decreases.

Thus, the present invention is a threaded joint for steel tubes constituted by a pin and a box each having a threaded portion and an unthreaded metal-to-metal contact portion both providing contact surfaces, characterized in that the contact surfaces of at least one of the pin and the box have a first plating layer made of a Cu—Zn alloy or a Cu—Zn-M1 alloy (wherein M1 is at least one element selected from Sn, Bi, and In).

Above and below the first plating layer, one or both of a lower (underlying) second plating layer and an upper (overlay) third plating layer can be provided. The lower second plating layer is at least one plating layer selected from Cu plating and Ni plating. The upper third plating layer is a plating layer made of an Sn-M2 alloy (wherein M2 is at least one element selected from Bi, In, Ni, Zn, and Cu).

The lower second plating layer can serve the role of increasing the adhesion of the first plating layer to the contact surfaces of the threaded joint which is the substrate which is plated. If the material of the threaded joint is carbon steel, there is usually no problem with adhesion of the first plating layer. However, if the material is stainless steel or a high alloy steel, the adhesion of the first plating layer is sometimes inadequate. If the adhesion decreases, the first plating layer cannot adequately exhibit the desired effect. In this case, by previously forming the above-described second plating layer as an undercoating atop the contact surfaces, adhesion of the first plating layer can be ensured. Cu plating or Ni plating is suitable as this second or lower plating layer, and both Cu plating and Ni plating can be used. The lower second plating layer may be an extremely thin layer formed by strike plating.

The formation of the upper third plating layer atop the first plating layer can further increase the galling resistance of a threaded joint for steel tubes. For this purpose, a soft plating layer having self-lubricating properties is suitable. Self-lubricating properties are lubricity exhibited when a material itself undergoes abrasion. A self-lubricating plating layer exhibits a high degree of lubricity since the lubricity is conferred not only by sliding resulting from abrasion of the plating layer but also by the action of the powder formed from the plating layer by abrasion which has the same effect on lubricity as Pb powder or the like present in dope. A typical metal plating of this type is Sn plating, but Sn has the problem referred to as tin pest that it becomes brittle by transformation from the β phase to the α phase at an extremely low temperature. Therefore, there is the strong possibility that it cannot exhibit sufficient self-lubricating effects in a severe environment of use to which a threaded joint for steel tubes is exposed.

The present inventors found that if at least one element selected from Bi, In, Ni, Zn, and Cu is added to Sn to form an Sn alloy plating layer, the plating layer can exhibit self-lubricating properties while eliminating the problem of tin pest. By forming this upper third plating layer, the galling resistance of a threaded joint for steel tubes can be further improved.

Usually, the plating layers used in the present invention are all formed by electroplating. In principle, it is also possible to employ other plating methods such as vapor phase plating and electroless plating (particularly with respect to the thin second plating layer). However, since the object being plated is a threaded joint formed on an end portion of a steel tube, it is difficult to apply plating methods other than electroplating.

At least one layer of a lubricating coating can be formed on the surface of the uppermost plating layer (the third plating layer when the upper third plating layer is formed or the first plating layer when it is not formed) to further increase the galling resistance of a threaded joint for steel tubes.

Such a lubricating coating is not always necessary in a threaded joint for steel tubes according to the present invention. This is particularly the case when a green dope is applied before makeup. However, when the material of the threaded joint is stainless steel or a high alloy steel which readily undergoes galling, by forming a lubricating coating as a top layer, the galling resistance of the threaded joint can be further improved, thereby making it possible to carry out makeup without application of a green dope, leading to improvement of the operating efficiency when assembling an oil country tubular good.

This lubricating coating can be one layer selected from a viscous liquid lubricating coating, a semisolid lubricating coating, and a solid lubricating coating. A viscous liquid lubricating coating and a semisolid lubricating coating have fluidity, so under high pressure conditions under which galling occurs, the lubricating components contained in the coating can be efficiently supplied into gaps between contact surfaces of a threaded joint by seepage, thereby exhibiting an especially high effect of preventing galling. The lubricating coating which is used is preferably one which contains substantially no heavy metal powder. A solid lubricating coating is preferably a coating comprising a suitable lubricating powder in an organic or inorganic binder matrix. The coating partly abrades under high surface pressure at the time of makeup or breakout, causing the lubricating powder present in the coating to be released and producing a lubricating effect.

The lubricating coating can be formed as two layers. In this case, a to combination of a solid lubricating coating as the lower layer and a viscous liquid lubricating coating or a semisolid lubricating coating as the upper layer is preferable from the standpoint of improving galling resistance.

In the case of the Cu—Sn alloy plating layer proposed in above-described. Patent Document 2, if this layer is covered by green dope applied thereto or with a lubricating coating such as a solid lubricating coating formed thereon, there is the problem that corrosion in the interface between the pin and the box due to crevice corrosion occurs quite easily. According to the present invention, by employing a plating layer of a Cu—Zn based alloy, this corrosion can be completely prevented, and a decease in leak resistance and galling resistance due to corrosion can be avoided. Accordingly, by forming one or more layers of a lubricating coating atop the plating layer, the galling resistance of a threaded joint for steel tubes can be further increased without the occurrence of crevice corrosion.

A threaded joint for steel tubes according to the present invention exhibits excellent leak resistance and galling resistance even in the absence of a dope, and it is useful for connecting oil country tubular goods used in severe environments. In addition, when a lubricating coating is formed atop the plating layer or green dope is applied for further improvement in galling resistance, it does not result in a decrease in corrosion resistance due to crevice corrosion. Therefore, if necessary, it is possible to achieve a further increase in galling resistance by utilizing a lubricating coating or green dope.

LIST OF REFERENTIAL NUMERALS OR SYMBOLS

A: steel tube; B: coupling; 1: pin; 2: box; 3a: male threaded portion; 3b: female threaded portion; 4a, 4b: unthreaded metal-to-metal contact portion; 5: shoulder portion; 30: steel surface; 32: lower second plating layer; 32a: Ni plating layer; 32b: Cu plating layer; 34: Cu—Zn based alloy plating layer (first plating layer); 36: upper Sn alloy plating layer (third plating layer); 38: lubricating coating; 38a: solid lubricating coating; 38b: semisolid or viscous liquid lubricating coating

BEST MODE FOR CARRYING OUT THE INVENTION

Below, embodiments of the present invention will be explained in detail. In the following explanation, unless otherwise specified, percent means mass percent.

Figure 1:
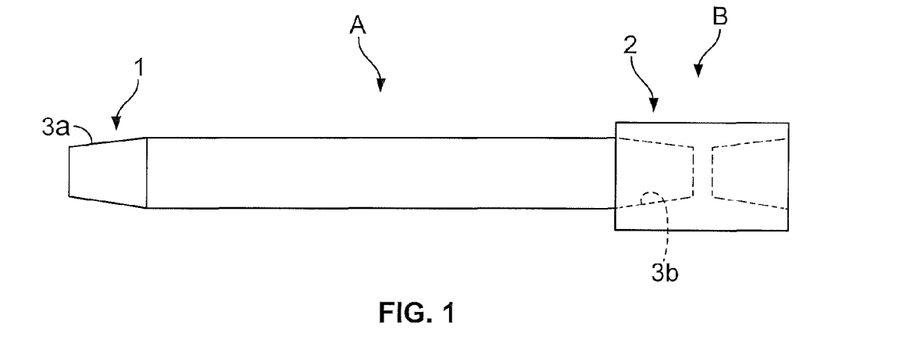
FIG. 1 schematically shows an example of the assembled structure of a steel tube and a coupling at the time of shipment of the steel tube.

FIG. 1 schematically illustrates the assembled structure of a typical threaded joint showing the state of a steel tube for an oil country tubular good and a coupling at the time of shipment. A pin 1 having a male threaded portion 3a on its outer surface is formed at both ends of a steel tube A, and a box 2 having a female threaded portion 3b on its inner surface is formed on both sides of a coupling B. A pin means the member of a threaded joint having a male (external) thread, and a box means the member of the threaded joint having a female (internal) thread. A coupling B is previously connected to one end of the steel tube A. Although not shown in the drawings, at the time of shipment, a protector for protecting the threaded portions is mounted on each of the unconnected pin of the steel tube A and the unconnected box of the coupling B. The protector is removed before use of the threaded joint.

Typically, as shown in the drawings, a pin is formed on the outer surface of both ends of a steel tube, and a box is formed on the inner surface of a coupling which is a separate member. However, in principle, the opposite arrangement is possible in which the inner surface of both ends of a steel tube is made a box and the outer surface of a coupling is made a pin. There is also an integral threaded joint which does not use a coupling and in which one end of a steel tube is made a pin and the other end is made a box. The present invention can be applied to all of these threaded joints.

Figure 2:
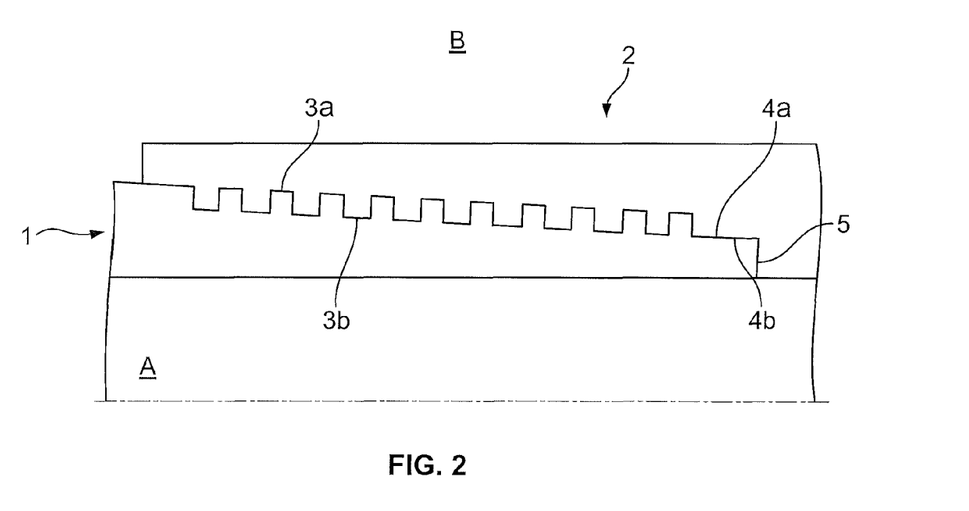
FIG. 2 schematically shows the connecting portions of a threaded joint.

FIG. 2 schematically shows the structure of a typical threaded joint for steel tubes (referred to below simply as a threaded joint). The threaded joint is constituted by a pin 1 formed on the outer surface of an end portion of a steel tube A and a box 2 formed on the inner surface of a coupling B. The pin 1 has a male threaded portion 3a, an unthreaded metal-to-metal contact portion 4a positioned at the tip of the steel tube, and an end-face shoulder portion 5. Correspondingly, the box 2 has a female threaded portion 3b and unthreaded metal-to-metal contact portion 4b on its inner surface.

The threaded portions 3a and 3b and the unthreaded metal-to-metal contact portions 4a and 4b of the pin 1 and box 2 constitute the contact surfaces of the threaded joint. These contact surfaces are required to have galling resistance, air tightness (leak resistance), and corrosion resistance. For this purpose, dope called compound grease which contains a considerable amount of heavy metal powder has conventionally been applied to the contact surfaces before makeup, but the use of such dope is now being regulated.

Figure 3:
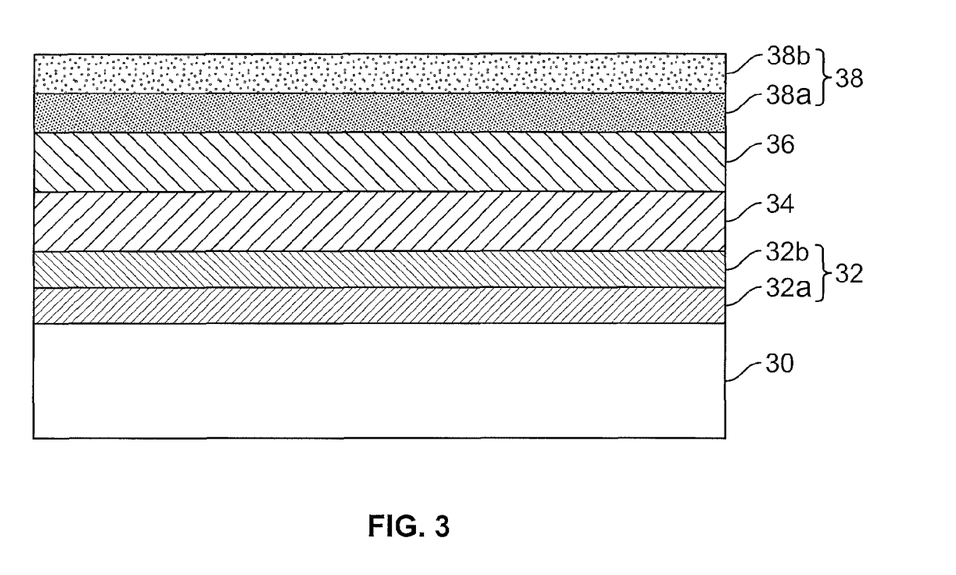
FIG. 3 is an explanatory view showing the coating structure formed on the contact surfaces of a threaded joint for steel tubes according to the present invention.

In a threaded joint according to the present invention, as shown in FIG. 3 with respect to the unthreaded metal-to-metal contact portion, starting from the bottom, second plating layers 32 composed of a lower Ni plating layer 32a and an upper Cu plating layer 32b, a first plating layer 34 of a Cu—Zn alloy or a Cu—Zn-M1 alloy (wherein M1 is at least one element selected from Sn, Bi, and In), a third plating layer 36 of a Sn-M2 alloy (wherein M2 is at least one element selected from Bi, In, Ni, Zn, and Cu), and a lubricating coating 38 composed of a lower layer in the form of a solid lubricating coating 38a and an upper layer in the form of a viscous liquid or semisolid lubricating coating 38b are formed on the contact surface of steel 30 of at least one of the pin and the box.

In the present invention, only the first plating layer 34 made of a Cu—Zn alloy or a Cu—Zn-M1 alloy (collectively referred to below as a Cu—Zn based alloy) is an essential layer. Even with just the first plating layer, it is possible to allow a threaded joint to exhibit a sufficient leak resistance and galling resistance depending on the material of the threaded joint and the environment of its use, for example, in the case of a threaded joint made of a carbon steel. The remaining second and third plating layers and the lubricating coating can be applied as necessary in accordance with the conditions for the material and the environment in use. Below, these layers, including the optional plating layers and lubricating coating, will be described in sequence.

[Base Steel Tube]

Steel tubes which are connected by a threaded joint according to the present invention are preferably oil country tubular goods. A threaded joint according to the present invention has extremely good galling resistance. Therefore, galling can be prevented when makeup and breakout are repeated even with a threaded joint made of a high alloy steel which readily undergoes galling.

Accordingly, there are no restrictions on the type of steel for the base steel tube (the type of steel constituting the threaded joint) from the standpoint of preventing galling. Thus, the steel may be carbon steel, stainless steel, or high alloy steel. From the standpoint of corrosion resistance, a high alloy steel containing at least 3% of Cr is preferred. Examples of such a steel are steels with a Cr content of 5%, 13%, or 25%.

The threaded portions and unthreaded metal-to-metal contact portions which constitute the contact surfaces of a threaded joint are normally formed by machining. The contact surfaces can be in an as-machined state, or the surfaces may be roughened by blasting treatment before forming a plating layer according to the present invention. If surface roughening is performed, the advantage is obtained particularly when a lubricating coating is formed after plating that the retention of the lubricating coating is increased. However, even if surface roughening is not performed, due to the perturbation of deposition in electroplating, the surface is somewhat roughened after electroplating, and adequate retention of a lubricating coating is possible.

When surface coating according to the present invention which includes one or more plating layers and optionally a lubricating coating is carried out on the contact surfaces of only one member of the pin and the box (e.g., the box), the contact surfaces of the other member (e.g., the pin) may be in an as-machined state, or a suitable one or more layers of coating other than that of the present invention may be formed thereon for the purpose of imparting lubricity and/or corrosion resistance. In a typical threaded joint constituted by a pin formed on the outer surface of the end of a steel tube and a box formed on the inner surface of a coupling, it is easier to perform surface coating according to the present invention on the box or the coupling which is a shorter member.

[Second Plating Layer for Undercoat]

In order to increase the adhesion of the first plating layer made of a Cu—Zn based alloy, if necessary, a second plating layer constituted by one or both of a Ni plating layer and a Cu plating layer can be formed below the first plating layer as undercoat.

The second plating layer for undercoating is preferably a thin plating layer formed by strike plating with a short operating time (a short period of electrolysis). Strike plating with Cu or Ni is well known in the field of plating, and in the present invention, it may be carried out in the same manner as conventional strike plating. In general, a chloride bath (such as a Wood's bath) or a sulfate bath (such as a Watts bath) is mostly used for Ni strike plating, and a cyanide bath (a copper cyanide plating bath) is mostly used for Cu strike plating. However, it is also possible to use other plating baths.

Before carrying out the initial plating, usual pretreatment such as degreasing and pickling is carried out in a conventional manner on the surface to be plated.

The thickness of the second plating layer for undercoating is preferably in the range of 0.2-2 μm and more preferably 0.5-1 μm. When forming both Cu and Ni plating layers, the total thickness of these two layers preferably does not exceed 2 μm.

A Ni plating layer is particularly effective at improving plating adhesion. Therefore, when the second plating layer is constituted by only one layer, it is preferably formed by Ni plating. Cu plating has good affinity to the first plating layer.

Therefore, when the undercoat second plating layer has two layers, it is preferable to use Ni plating for the lower layer 32a and Cu plating for the upper layer 32b.

[First Plating Layer]

The first plating layer made of a Cu—Zn based alloy is an essential layer in the present invention for imparting leak resistance and galling resistance to a threaded joint and at the same time preventing the occurrence of crevice corrosion even when the contact surfaces of a threaded joint are coated with green dope or a lubricating coating for improving galling resistance, thereby avoiding a decrease in leak resistance and galling resistance. When the above-described second plating layer is not formed as undercoat, this first plating layer is the lowermost layer of plating.

Generally, the thickness of the first plating layer is preferably 1-40 μm and more preferably 3-20 μm.

When the first plating layer is made of a Cu—Zn alloy, the Zn content of the alloy is preferably in the range of 20-90% and more preferably it is 30-70%. If the Zn content is too low, the corrosion resistance of the plating layer decreases, and crevice corrosion can no longer be prevented. If the Zn content is too high, leak resistance and galling resistance decrease.

When the first plating layer is made of a Cu—Zn-M1 alloy (wherein M1 is one or more elements selected from Sn, Bi, and In), a preferred alloy composition is Cu: 30-60%, Zn: 3-30%, and M1 (the total amount when there is more than one element): 20-60%. 35-55% of Sn is particularly preferred as M1.

[Third Plating Layer for Overcoat]

The first plating layer does not contain Sn or contains Sn with a relatively small Sn content. Therefore, the galling resistance of a threaded joint according to the present invention can be further increased by forming a overcoat plating layer having high self-lubricating properties atop the first plating layer. For this purpose, the third plating layer as overcoat is made of a Sn-M2 alloy (wherein M2 is one or more elements selected from Bi, In, Ni, Zn, and Cu). This third plating layer can be formed atop the first plating layer if necessary.

Bi is particularly preferred as M2. Generally, the thickness of the third plating layer is preferably 3-40 μm and more preferably 5-25 μm. When the third plating layer is formed, the total thickness of the second plating layer and the third plating layer is preferably at most 40 μm. The content of alloying element M2 in the Sn-M2 alloy (the total when there are two or more alloying elements) is preferably in the range of 0.1-50% and more preferably in the range of 0.1-10%. If the content of alloying element M2 is too high, leak resistance and galling resistance decrease, and if it is too low, it is no longer possible to prevent the occurrence of tin pest.

The first plating layer made of a Cu—Zn based alloy and the third plating layer made of a Sn-M2 alloy can both be formed by electroplating using a known sulfate bath, cyanide bath, methanesulfonate bath, gluconate bath, pyrophosphate bath, citrate bath, tartarate bath, sulfosuccinate bath, or borofluoride bath. Plating conditions such as the bath temperature, the pH, and the current density can be determined taking into consideration easiness of bath control or productivity as long as a plating layer of a suitable alloy composition is obtained. As is known to those skilled in the art, a plating bath may contain various additives such as a brightener and a pH adjusting agent in addition to compounds serving as sources for metal ions to be deposited.

More specifically, the Cu—Zn alloy plating which can be used to form the first plating layer is referred to as brass plating and has been used from long in the past with the object of decoration or of improving the adhesion to rubber. Alkaline cyanide baths have been much used as plating solutions, but non-cyanide baths such as acidic pyrophosphate baths and glucoheptonate baths can also be used. A cyanide bath is preferred in the present invention.

When the first plating layer is a Cu—Zn-M1 alloy, plating can be carried out in the same manner as above using a plating bath for a Cu—Zn alloy to which a compound of M1 metal compound has been added and dissolved therein. Cu—Zn—Sn plating forms a gold colored coating, so from long in the past it has been used as a substitute for gold plating. The color tone of the plated coating changes with the Sn content (it becomes a silvery white color as the Sn content increases), and many cyanide plating baths having different compositions are available on the market. They can be used to form the first plating layer as it is.

Sn-M2 alloy plating for forming the third plating layer can be carried out in the same manner as in tin electroplating using a plating bath which contains an Sn compound and at least one compound of M2 metal or metals dissolved therein. In the present invention, a particularly preferred bath for this plating is a methane-sulfonate bath.

[Lubricating Coating]

A threaded joint according to the present invention can exhibit sufficient galling resistance and leak resistance when having only the above-described first plating layer made of an Sn—Zn based alloy and optionally a lower second plating layer and/or an upper third plating layer on its contact surfaces, and when it is used with or without a green dope which applied prior to makeup depending on the material of the threaded joint. However, when the material of the threaded joint is, for example, a high alloy steel which readily undergoes galling, if necessary, at least one layer of a lubricating coating can be foliated atop the plating layer to further increase galling resistance.

The lubricating coating can be one or more layers selected from a viscous liquid lubricating coating, a semisolid lubricating coating, and a solid lubricating coating. Such lubricating coatings are well known. For example, JP 2001-65751. A1, JP 2002-221288 A1, JP 2002-327875 A1, and JP 2002-348587 A1 describe a solid lubricating coating which is a baked coating having a lubricating powder dispersed in a binder matrix, and JP 2002-173692 A1 and JP 2004-53013 A1 describe a viscous liquid or semisolid lubricating coating which is a coating containing various lubricating components in a base oil. Such known lubricating coatings can be used in the present invention.

One or two layers of a lubricating coating are normally sufficient. When there are two layers, it is preferable for the lower layer to be a solid lubricating coating and for the upper layer to be a viscous liquid lubricating coating or a semisolid lubricating coating because this provides a large effect of improving galling resistance. When there are two lubricating coating layers, the upper lubricating coating layer is preferably a viscous liquid lubricating coating which has a greater fluidity than a semisolid lubricating coating.

The solid lubricating coating is preferably a coating containing a lubricating powder, i.e., it is a lubricating coating in which particles of a lubricating powder are bonded using a suitable inorganic or organic binder.

Examples of lubricating powders suitable for use in a solid lubricating coating include, but not limited to, graphite, $MoS_2$ (molybdenum disulfide), $WS_2$ (tungsten disulfide), BN (boron nitride), PTFE (polytetrafluoroethylene), CFx (graphite fluoride), $CaCO_3$ (calcium carbonate), and the like. Among these, graphite, graphite fluoride, $MoS_2$, and $WS_2$ are more preferred. These substances have a layered crystal structure in which the bonding strength within crystal planes is strong but the bonding strength between planes is weak, so they readily develop interplanar cleavage which imparts a sliding effect, and they are suitable for increasing galling resistance.

An organic and/or inorganic film-forming component can be used as a binder for a solid lubricating coating. Examples of organic film-forming components are organic resins having good heat resistance such as epoxy resins, polyimide resins, and polyamideimide resins. Examples of inorganic film-forming components are organic or inorganic compounds which can form a metal oxide coating, such as silica sol, alkoxysilanes, and titanium alkoxides.

A solid lubricating coating can be formed by mixing lubricating powder with a solution of a film-forming binder to prepare a coating composition and applying the coating compositing to the contact surfaces of a threaded joint, preferably followed by heating to bake the coating. The heating temperature depends upon the type of binder, and in the case of an epoxy resin, the temperature is preferably approximately 150-250° C.

A preferred solid lubricating coating has a coating thickness of 5-30 μm and contains 10-50% of lubricating powder in the coating.

A viscous liquid or semisolid lubricating coating preferably contains substantially no powders of heavy metals such as Pb, Zn, and Cu which are harmful to the environment and to humans. Such a lubricating coating comprises a base oil (such as mineral oil, a higher fatty acid ester, or grease) and a considerable amount of one or more lubricity imparting components (for example, a highly basic metal salt such as a highly basic calcium sulfonate, phenate, salicylate, or carboxylate which functions as an extreme pressure agent, a wax, and a metal soap), and its nature is either a viscous liquid or a semisolid depending on the viscosity of the base oil and the content of solid components. This lubricating coating can also be formed using a commercially available green dope. The thickness of a viscous liquid or semisolid lubricating coating is preferably in the range of 10-200 μm.

A threaded joint according to the present invention particularly having at least one layer of a lubricating coating formed atop the plating layer(s) can be used without the application of green dope prior to tightening (makeup) operations, whereby the efficiency of assembling operations of oil country tubular goods is is increased. However, a green dope may be applied to such a threaded joint, as required, prior to makeup.

A threaded joint according to the present invention is prevented from suffering crevice corrosion even when a lubricating coating is formed atop the uppermost plating layer. Therefore, even if the threaded joint is stored for a long period prior to use, corrosion of the contact surfaces of the threaded joint and galling which easily occurs due to this corrosion can be prevented.

Below, the effects of the present invention will be illustrated by examples of the present invention and comparative examples. However, the present invention is not limited to these examples.

EXAMPLES

A large number of pins each having a male threaded portion and an unthreaded metal-to-metal contact portion (metal-to-metal seal portion) were formed by machining on both ends of seamless steel tubes having an outer diameter of 244.5 mm, a wall thickness of 13.84 mm, and a length of 1200 mm which were made from a 13% Cr steel (containing Ni and Mo), which is a high alloy steel. Correspondingly, a large number of boxes to which one of the pins could be connected and each of which has a female threaded portion and an unthreaded metal-to-metal contact portion were formed by machining on both sides of the inner surface of couplings made from the same steel.

The entire inner peripheral surface of each coupling including the contact surfaces of the box having the threaded portion and the unthreaded metal-to-metal contact portion was treated so as to form one or more layers of plating and optionally one or more layers of lubricating coating having the coating structure shown in Table 1 (shown in order from the uppermost layer towards the bottommost layer). Plating was carried out all by electroplating after the outer surface and the end surfaces of the coupling were sealed with a suitable sealant and the coupling was then subjected to degreasing and pickling. The pin was not subjected to treatment except for blasting with glass beads which was performed to remove scale prior to testing.

A summary of the various treatments carried out on the inner surfaces of the boxes was as follows.

[Undercoat Second Plating Layer]
Ni plating: formed with a Wood's bath;
Cu plating: formed with a cyanide bath.

[Cu—Zn Based First Plating Layer]
Each formed with a cyanide bath.
Cu—Zn alloy plating: approximately 32% Zn;
Cu—Zn—Sn alloy plating: approximately 7% Zn and approximately 40% Sn;
Cu—Zn—Bi alloy plating: approximately 30% Zn and approximately 10% Bi;
Cu—Zn—In alloy plating: approximately 25% Zn and approximately 15% In.

[Overcoat Third Plating Layer of a Sn Alloy]
Each formed with a methanesulfonate bath.
Sn—In alloy plating: approximately 5% In;
Sn—Cu—Bi alloy plating: approximately 10% Cu and approximately 1% Bi;
Sn—Ni alloy plating: approximately 8% Ni;
Sn—Bi alloy plating: approximately 1% Bi;
Sn—Zn alloy plating: approximately 3% Zn.

Comparative Examples

The plating layers used in the Comparative Examples were the same as described above except for the below-described plating layer:
Cu—Sn alloy plating: A neutral bath was used. Approximately 36% Cu and approximately 64% Sn.

[Lubricating Coating]
Graphite-containing solid lubricating coating: formed by application of a coating composition containing 30% of graphite as a lubricating powder dispersed in an epoxy resin followed by baking (heating temperature approximately 200° C.).

Solid lubricating coating containing graphite fluoride: formed by application of a coating composition containing 4% of CFx (graphite fluoride) as a lubricating powder and 10% of wax dispersed in a polyethylene resin after heating to 150° C.

Viscous liquid lubricating coating: formed by application of a grease-like is composition comprising mineral oil as a base oil and wax and highly basic calcium sulfonate as lubricating components. The thickness was approximately 100 μm.

[Green Dope]
The green dope used was Bestolife™ 3010 NM SPECIAL manufactured by Bestolife Corporation. The coating thickness was approximately 100 μm. Green dope is normally applied in the field prior to makeup, but in the test in this example, it was sometimes applied as final coating of the coating treatment for a threaded joint.

Using a box having the coating treatment shown in Table 1 and a pin, tightening (makeup) and loosening (breakout) were repeated in order to evaluate with respect to galling resistance. This galling resistance test was carried out by tightening at room temperature to a torque of 49351.8 N-m (36400 ft-lbs) and then loosening and disconnecting the pin, removing the lubricating coating adhering to the pin with a solvent, and then observing the outer peripheral surface of the pin to examine the state of occurrence of galling. This procedure was repeated for 10 cycles and the number of cycles until galling occurred (the number of cycles of tightening and loosening without occurrence of galling) was made the test result. If the number of cycles is 10, it means galling did not occur through the end of the tenth cycle.

In a corrosion test for examining crevice corrosion, the same coating treatment for a box as shown in Table 1 was performed on a steel plate (width of 12 min, length of 30 mm, thickness of 3 mm) of the same steel composition as described above (13% Cr steel). The coated steel plate was superimposed with its coating facing downward on a steel plate (width of 20 mm, length of 30 mm, thickness of 3 mm) of the same steel which had been blasted with glass beads, and the two steel plates were secured to each other by a bolt at their centers to form a test piece. This test piece was immersed for one month in boiling saline solution containing 20% NaCl, and the maximum corrosion depth in the overlapping region was measured. Corrosion resistance was ranked in terms of the maximum corrosion depth as follows:

| Rank | Maximum corrosion depth |
| --- | --- |
| A | less than 1 μm |
| B | at least 1 μm and less than 5 μm |
| C | at least 5 μm and less than 10 μm |
| D | 10 μm or greater. |

The above test results are shown in Table 1.

TABLE 1

| | Coating structure on box inner surface | | Result of galling resistance test | Result of |
| --- | --- | --- | --- | --- |
| Example No. | Coating structure from the top layer | Thickness (μm) | number of cycles of tightening and loosening without galling | corrosion test |
| Example 1 | green dope | — | 8 cycles | A |
| | Cu—Zn alloy plating | 16 | | |
| Example 2 | green dope | — | 10 cycles | A |
| | Cu—Zn alloy plating | 8 | | |
| | Ni plating | 1 | | |

TABLE 1-continued

| Example No. | Coating structure on box inner surface | | Result of galling resistance test | Result of corrosion test |
|---|---|---|---|---|
| | Coating structure from the top layer | Thickness (μm) | number of cycles of tightening and loosening without galling) | |
| Example 3 | green dope | — | 10 cycles | A |
| | Cu—Zn alloy plating | 8 | | |
| | Cu plating | 0.5 | | |
| | Ni plating | 0.5 | | |
| Example 4 | green dope | — | 10 cycles | A |
| | Cu—Zn—Sn alloy plating | 16 | | |
| Example 5 | green dope | — | 10 cycles | A |
| | Cu—Zn—Sn alloy plating | 8 | | |
| | Ni plating | 1 | | |
| Example 6 | green dope | — | 10 cycles | A |
| | Cu—Zn—Sn alloy plating | 4 | | |
| | Cu plating | 0.5 | | |
| | Ni plating | 1 | | |
| Example 7 | green dope | — | 8 cycles | A |
| | Cu—Zn—Bi alloy plating | 40 | | |
| Example 8 | green dope | — | 10 cycles | A |
| | Cu—Zn—In alloy plating | 20 | | |
| | Ni plating | 0.5 | | |
| Example 9 | graphite-containing solid lubricating coating | 30 | 10 cycles | A |
| | Cu—Zn alloy plating | 8 | | |
| | Ni plating | 1 | | |
| Example 10 | viscous liquid lubricating coating | — | 10 cycles | A |
| | graphite fluoride-containing solid lubricating coating | 10 | | |
| | Cu—Zn alloy plating | 8 | | |
| | Ni plating | 1 | | |
| Example 11 | graphite-containing solid lubricating coating | 30 | 10 cycles | A |
| | Cu—Zn—Sn alloy plating | 8 | | |
| | Ni plating | 1 | | |
| Example 12 | viscous liquid lubricating coating | — | 10 cycles | A |
| | graphite-containing solid lubricating coating | 10 | | |
| | Cu—Zn—Sn alloy plating | 8 | | |
| | Ni plating | 1 | | |
| Example 13 | graphite-containing solid lubricating coating | 30 | 8 cycles | A |
| | Sn—In alloy plating | 3 | | |
| | Cu—Zn alloy plating | 16 | | |
| Example 14 | graphite-containing solid lubricating coating | 30 | 10 cycles | A |
| | Sn—Cu—Bi alloy plating | 40 | | |
| | Cu—Zn alloy plating | 3 | | |
| | Ni plating | 1 | | |
| Example 15 | viscous liquid lubricating coating | — | 10 cycles | A |
| | graphite-containing solid lubricating coating | 10 | | |
| | Sn—Ni alloy plating | 16 | | |
| | Cu—Zn—Sn alloy plating | 8 | | |
| Example 16 | viscous liquid lubricating coating | — | 10 cycles | A |
| | graphite-containing solid lubricating coating | 10 | | |
| | Sn—Bi alloy plating | 20 | | |
| | Cu—Zn—Sn alloy plating | 8 | | |
| | Ni plating | 1 | | |
| Example 17 | viscous liquid lubricating coating | — | 10 cycles | A |
| | graphite-containing solid lubricating coating | 10 | | |
| | Sn—Zn alloy plating | 4 | | |
| | Cu—Zn—Sn alloy plating | 8 | | |
| | Cu plating | 0.5 | | |
| | Ni plating | 0.5 | | |
| Comparative Example 1 | green dope | — | 4 cycles | C |
| | Cu plating | 10 | | |
| | Ni plating | 1 | | |
| Comparative Example 2 | green dope | — | 4 cycles | C |
| | graphite-containing solid lubricating coating | 25 | | |
| | Cu plating | 10 | | |
| | Ni plating | 1 | | |

TABLE 1-continued

| Example No. | Coating structure on box inner surface — Coating structure from the top layer | Thickness (μm) | Result of galling resistance test (number of cycles of tightening and loosening without galling) | Result of corrosion test |
|---|---|---|---|---|
| Comparative Example 3 | green dope | — | 2 cycles | C |
| | graphite-containing solid lubricating coating | 25 | | |
| | Sn plating | 10 | | |
| | Ni plating | 1 | | |
| Comparative Example 4 | green dope | — | 8 cycles | D |
| | Cu—Sn alloy plating | 10 | | |
| | Ni plating | 1 | | |
| Comparative Example 5 | Cu plating | 8 | 2 cycles | C |
| | Ni plating | 1 | | |
| Comparative Example 6 | graphite-containing solid lubricating coating | 25 | 3 cycles | C |
| | Cu plating | 8 | | |
| | Ni plating | 1 | | |
| Comparative Example 7 | green dope | — | 4 cycles | B |
| | Sn—Bi alloy plating | 20 | | |
| | Ni plating | 1 | | |
| Comparative Example 8 | graphite-containing solid lubricating coating | 25 | 6 cycles | D |
| | Cu—Sn alloy plating | 12 | | |
| | Ni plating | 1 | | |

As shown in Table 1, in spite of the test conditions that the steel was a high alloy steel which readily undergoes galling and that surface treatment was carried out only on the box, in all the examples according to the present invention, good results were obtained in both of galling resistance and corrosion resistance. Specifically, when a Cu—Zn based first plating layer was formed directly on the base metal surface without a lower plating layer, galling did not occur through at least the eighth cycle. On the other hand, when a lower layer of Ni plating or Ni and Cu plating was formed below the first plating layer, there was no occurrence of galling through the tenth cycle, and extremely high galling resistance was obtained. In each example, the corrosion resistance had rank A, i.e., the maximum corrosion depth in the test conditions was less than 1 μm, so extremely high corrosion resistance was obtained.

In contrast, as shown in the comparative examples, with Cu plating, Sn plating, or Sn—Bi alloy plating, galling resistance decreased even if a lower plating layer was formed. Cu—Sn plating had good galling resistance, but its corrosion resistance was extremely low.

The invention claimed is:

1. A threaded joint for steel tubes constituted by a pin and a box each having a contact surface including a threaded portion and an unthreaded metal-to-metal contact portion, characterized in that the contact surface of at least one of the pin and the box has a first plating layer made of a Cu—Zn-M1 alloy (wherein M1 is one or more elements selected from Sn, Bi, and In) having a composition of Cu: 30-60%, Zn 3-30%, and M1 (the total amount when there is more than one element) 20-60%.

2. A threaded joint for steel tubes as set forth in claim 1 wherein the contact surface of at least one of the pin and the box has at least one second plating layer selected from Cu plating and Ni plating as an undercoat layer below the first plating layer.

3. A threaded joint for steel tubes as set forth in claim 2 wherein the contact surface of at least one of the pin and the box has a third plating layer made of a Sn-M2 alloy (wherein M2 is at least one element selected from Bi, In, Ni Zn, and Cu) as an overcoat layer atop the first plating layer.

4. A threaded joint for steel tubes as set forth in claim 3 wherein at least one layer of a lubricating coating is formed on the surface of the overcoat layer.

5. A threaded joint for steel tubes as set forth in claim 2 wherein at least one layer of a lubricating coating is formed on the surface of the first plating layer.

6. A threaded joint for steel tubes as set forth in claim 1 wherein the contact surface of at least one of the pin and the box has an additional plating layer made of a Sn-M2 alloy (wherein M2 is at least one element selected from Bi, In, Ni Zn, and Cu) as an overcoat layer atop the first plating layer.

7. A threaded joint for steel tubes as set forth in claim 6 wherein at least one layer of a lubricating coating is formed on the surface of the overcoat layer.

8. A threaded joint for steel tubes as set forth in claim 1 wherein at least one layer of a lubricating coating is formed on a surface of the first plating layer.

9. A threaded joint for steel tubes as set forth in claim 8 wherein the lubricating coating is one layer of a lubricating coating selected from a viscous liquid lubricating coating, a semisolid lubricating coating, and a solid lubricating coating.

10. A threaded joint for steel tubes as set forth in claim 9 wherein the solid lubricating coating contains a lubricating powder.

11. A threaded joint for steel tubes as set forth in claim 8 wherein the lubricating coating is two layers of a lubricating coating consisting of a lower layer in the form of a solid lubricating coating and an upper layer in the form of a viscous liquid lubricating coating or a semisolid lubricating coating.

12. A threaded joint for steel tubes as set forth in claim 11 wherein the solid lubricating coating contains a lubricating powder.

* * * * *